United States Patent
Briat

(10) Patent No.: US 11,106,582 B2
(45) Date of Patent: Aug. 31, 2021

(54) MEMORY CONTROLLER

(71) Applicant: STMicroelectronics (Grenoble 2) SAS, Grenoble (FR)

(72) Inventor: Gerald Briat, Grenoble (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 16/530,049

(22) Filed: Aug. 2, 2019

(65) Prior Publication Data
US 2020/0057719 A1    Feb. 20, 2020

(30) Foreign Application Priority Data

Aug. 17, 2018  (FR) ...................................... 1857517

(51) Int. Cl.
*G06F 12/0806* (2016.01)

(52) U.S. Cl.
CPC .... *G06F 12/0806* (2013.01); *G06F 2212/608* (2013.01)

(58) Field of Classification Search
CPC ....................... G06F 12/0806; G06F 2212/608
See application file for complete search history.

(56) References Cited

U.S. PATENT DOCUMENTS

| | | | | |
|---|---|---|---|---|
| 5,055,661 A | * | 10/1991 | Gochi | G06K 19/07 235/492 |
| 2008/0262760 A1 | * | 10/2008 | Sakurai | G06F 13/4045 702/58 |
| 2014/0164713 A1 | | 6/2014 | Sim et al. | |
| 2015/0347012 A1 | * | 12/2015 | Dewitt | G06F 13/28 710/27 |
| 2015/0363107 A1 | * | 12/2015 | Best | G11C 7/1093 711/105 |
| 2018/0239722 A1 | * | 8/2018 | Sadowski | G06F 13/1684 |
| 2018/0285013 A1 | * | 10/2018 | Rajan | G06F 3/0673 |
| 2020/0142843 A1 | * | 5/2020 | Hung | G06F 3/061 |

OTHER PUBLICATIONS

Honarmand, Nima, "Main Memory and DRAM", Stony Brook University, Cse 502—Computer Architecture, Spring 2015, 37 pages.
Hussain, Tassadaq, "A novel hardware support for heterogeneous multi-core memory system", Journal of Parallel and Distributed Computing, vol. 106, Mar. 16, 2017, pp. 31-49.
Park, Jaehyun, et al., "Prefetch-based Dynamic Row Buffer Management for LPDDR2-NVM Devices", 2015 IFIP/IEEE International Conference on Very Large Scale Integration VLSI-SOC, Oct. 5, 2015, pp. 98-103.

* cited by examiner

*Primary Examiner* — Eric Cardwell
(74) *Attorney, Agent, or Firm* — Slater Matsil, LLP

(57) ABSTRACT

A device includes first and second buffers fillable with contents of memory locations. A selection circuit is configured to select a filling mode between simultaneous filling of the buffers and sequential filling of the buffers. In some examples, the device can be a system on a chip that includes a non-volatile memory and a processor.

19 Claims, 7 Drawing Sheets

MEMORY CONTROLLER

CROSS-REFERENCE TO RELATED APPLICATIONS

This application claims priority to French Patent Application No. 1857517, filed on Aug. 17, 2018, which application is hereby incorporated herein by reference.

TECHNICAL FIELD

The present disclosure generally concerns electronic circuits, and more particularly devices of reception of contents of memory locations, such as memory controllers.

BACKGROUND

A memory controller is generally used between a memory and circuits having access thereto, for example, in an electronic integrated circuit chip.

SUMMARY

Embodiments can overcome all or part of the disadvantages of known devices of reception of contents of memory locations, such as memory controllers.

Thus, an embodiment provides a device comprising two buffers fillable with contents of memory locations, and a selector of a filling mode between the simultaneous filling of the buffers and the sequential filling of the buffers.

According to an embodiment, the content of each location comprises a plurality of pieces of data, preferably two pieces of data. Each of the buffers is configured to be simultaneously filled with the plurality of pieces of data.

According to an embodiment, the device comprises a circuit for sending one of the pieces of data over a bus of same size as the data.

According to an embodiment, the two buffers are fillable with the respective contents of first and second locations having alternated addresses, preferably logic.

According to an embodiment, the device further comprises two additional buffers sequentially fillable with addresses of respective contents of the first and second memory locations.

According to an embodiment, the device is configured so that the sequential filling of the buffers is a filling with the contents of consecutive memory locations.

Another embodiment provides an electronic chip, comprising a device as described above.

Another embodiment provides a method comprising first and second operations of filling of two buffers with memory location contents. The buffers are simultaneously filled at the first filling and sequentially filled at the second filling.

According to an embodiment, the content of each location comprises a plurality of pieces of data, preferably two pieces of data. Each of the buffers is simultaneously filled with the plurality of pieces of data during the first and second filing operations.

According to an embodiment, the method comprises a step of sending one of the pieces of data over a bus of same size as the data.

According to an embodiment, the two buffers are respectively filled with first and second locations having alternated addresses, preferably logic.

According to an embodiment, the method comprises a step of storing into an additional buffer one of the addresses of the first and second locations.

According to an embodiment, the method comprises a step of verification of the equality between a request address and the address stored at the storage step.

According to an embodiment, the presence of a step of reading out the content of one of the locations is a function of the result of the equality verification step.

According to an embodiment, at the first filling, the buffers are filled with the respective contents of consecutive memory locations.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
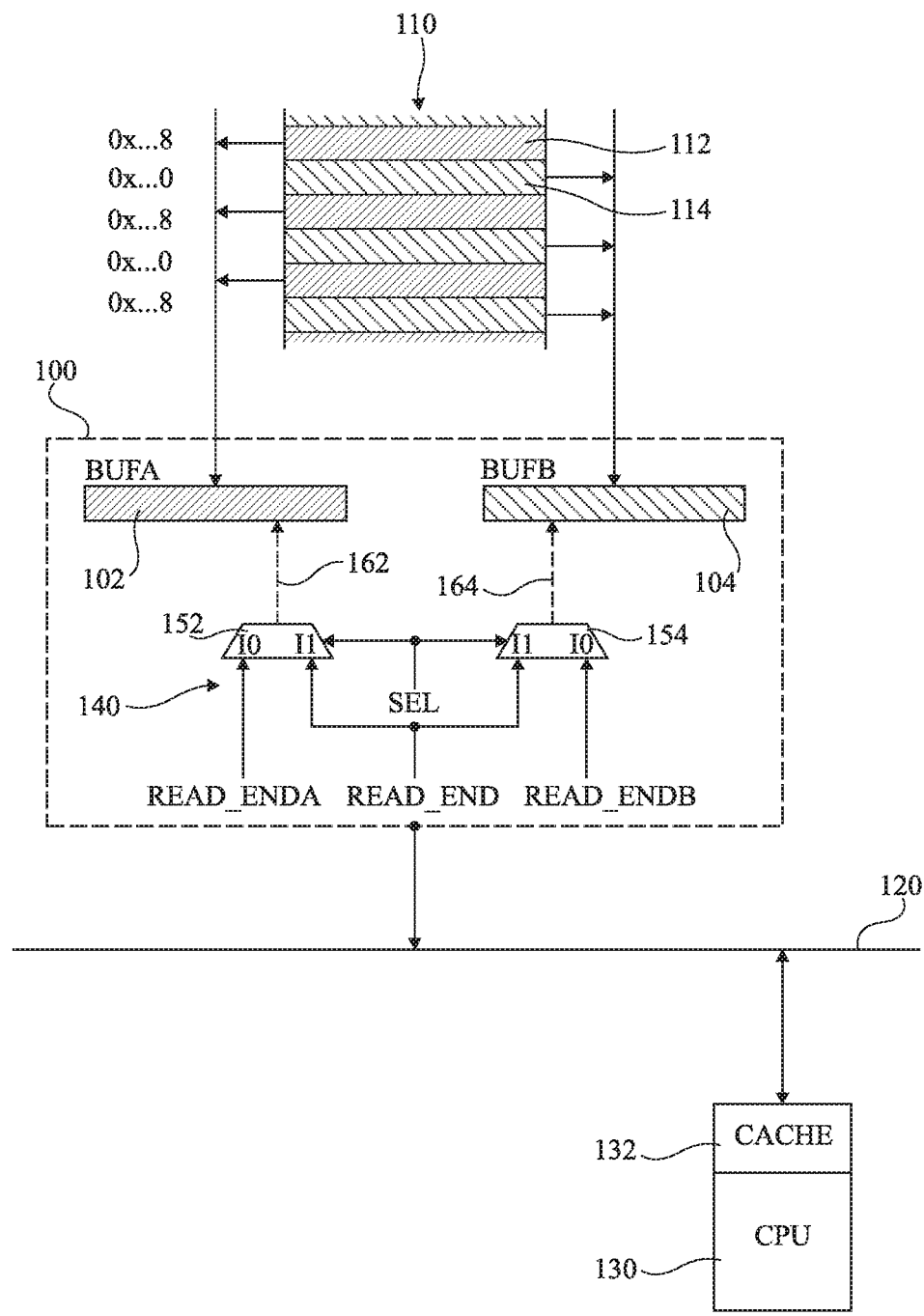
FIG. 1 partially and schematically shows a chip comprising an embodiment of a device of reception of contents of memory locations.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "substantially", and "approximately" are used herein to designate a tolerance of plus or minus 10%, preferably of plus or minus 5%, of the value in question.

FIG. 1 schematically shows a device, for example, an integrated circuit chip, comprising an embodiment of a device 100 of reception of contents of a memory 110, preferably, a rewritable non-volatile memory of so-called "flash" type.

The chip is preferably of so-called SOC ("System On a Chip") type. SOC-type chips are particularly used in embarked or mobile applications, such a mobile telephony, connected objects, household appliances, or transport.

Device 100 is coupled, for example, connected, to a data bus 120. Preferably, a data processing unit, such as a microprocessor 130 (CPU), is coupled to bus 120. Bus 120 particularly enables to transmit data from the memory to the processing unit. Various peripherals, not shown, such as sensors, or circuits of communication with elements external to the chip, may be coupled or connected to bus 120. Preferably, the coupling between device 100 and bus 120 transmits in parallel all the bits of a piece of data, for example, 32 bits. Preferably, data bus 120 has a size, that is, a number of bits in parallel, equal to the number of bits of each piece of data.

Preferably, microprocessor 130 comprises, or is coupled to, a cache memory 132 (CACHE). A cache memory is a memory for example having an access time shorter than that of memory 110 and used as a buffer between bus 120 and microprocessor 130.

Memory 110 comprises a succession of locations 112 and 114. Preferably, memory locations 112 and 114 follow each other in alternated fashion in the order of their addresses, preferably their logic addresses. As an example, locations 112 and 114 have the same number of bits, preferably 64 bits. The addresses then for example have form 0x . . . 8 for locations 112, and form 0x . . . 0 for locations 114, where "0x" means a hexadecimal notation, and " . . . " represents hexadecimal digits of the considered address. The content of each of locations 112 and 114 corresponds to one or a plurality of pieces of data. Preferably, each of locations 112 and 114 contains two pieces of data. Preferably, each piece of data corresponds to 32 least or most significant bits of the considered memory location.

Device 100 comprises a buffer 102 (BUFA) and a buffer 104 (BUFB). Term "buffer" is used to designate a buffer circuit such as a buffer memory, for example, an assembly of flip-flops. Each buffer 102, 104 preferably contains the same number of bits as one of memory locations 112, 114.

Buffers 102 and 104 are fillable with respective contents of memory locations 112 and 114. Preferably, buffer 102 is configured or arranged to be filled with the content of a location selectable from among locations 112. Preferably, buffer 104 is configured or arranged to be filled with the content of a location selectable from among locations 114.

Preferably, on filling of each buffer 102 and 104, the filling is simultaneously performed by all the bits of the content of a memory location. In particular, in the case where each location comprises a plurality of pieces of data, the filling is then performed simultaneously by all the data of the content of a memory location.

Device 100 further comprises a selector 140 of the filling mode of buffers 102 and 104. In a first filling mode, buffers 102 and 104 are simultaneously filled, that is, each buffer 102, 104 is loaded at the same time as the other with the respective content of one of memory locations 112, 114. In a second filling mode, buffers 102 and 104 are sequentially filled, that is, during the filling of one of the buffers, the content of the other is left unchanged.

Preferably, selector 140 comprises two multiplexers 152 and 154 controlling the filling of respective buffers 102 and 104. As an example, the filling of buffers 102 and 104 is controlled by respective signals 162 and 164. Multiplexers 152 and 154 are controlled by a filling mode selection signal SEL. The multiplexers here have inputs I0 and I1 selectable according to the high or low state of the multiplexer control signal. Inputs I0 and I1, and the low and high levels of the control signals may be exchanged. The inputs I1 of multiplexers 152 and 154 are coupled to a node of application of a same signal READ_END. The inputs I0 of multiplexers 152 and 154 are for example coupled to nodes of application of different respective signals READ_ENDA and READ_ENDB. The device is preferably configured for signals READ_ENDA and READ_ENDB not to be transmitted simultaneously, as illustrated hereafter.

Figure 2:
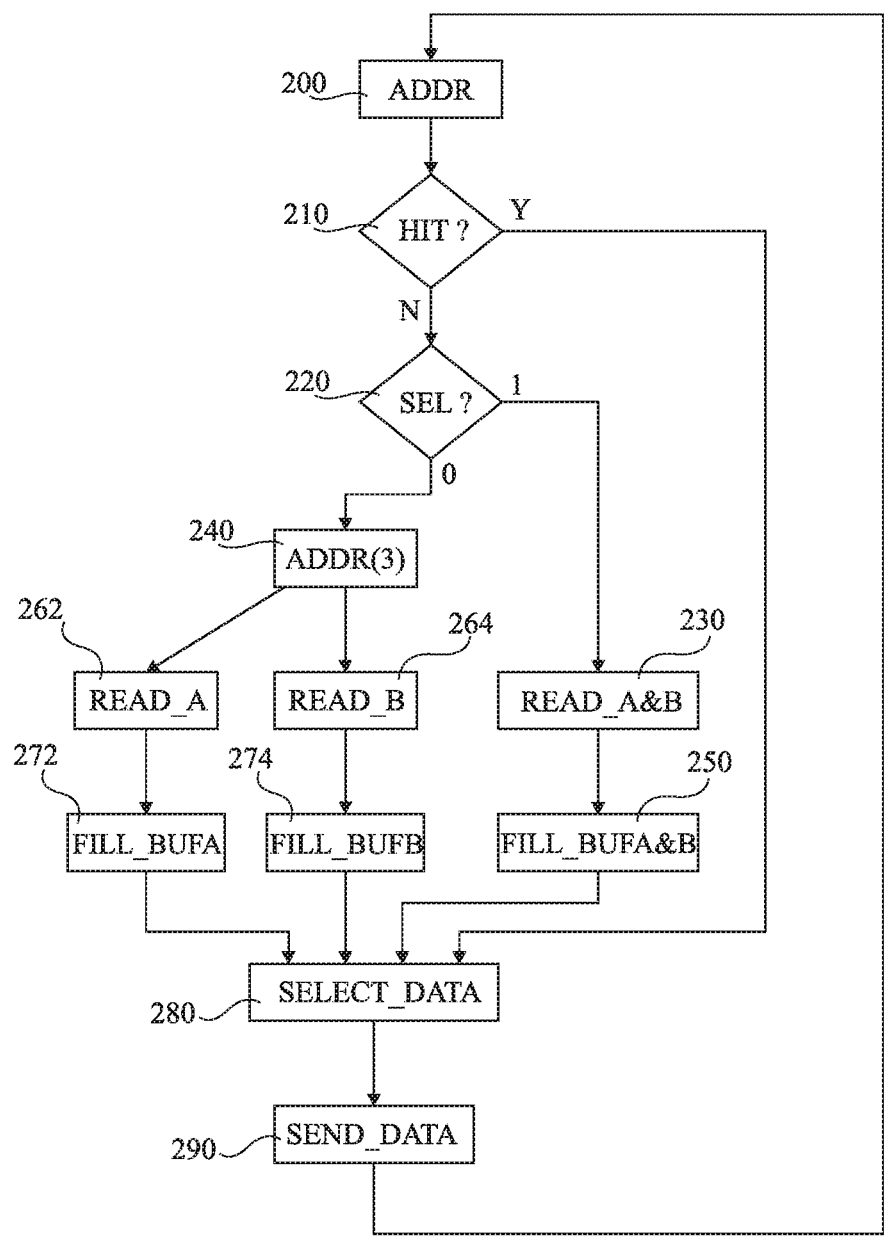
FIG. 2 schematically shows steps of an embodiment of a method implemented by the device of FIG. 1.

FIG. 2 schematically shows steps of an embodiment of a method implemented by reception device 100 of FIG. 1.

Preferably, at a step 200, device 100 receives a request address ADDR, preferably, a logic address. For example, this address is transmitted by microprocessor 130 and/or cache memory 132 when they need a piece of data located in memory 110 at the request address. Request address ADDR may also be transmitted by any device coupled to bus 120, such as a device of direct access to the DMA type ("Direct Memory Access") memory. To receive the request address, device 100 is preferably coupled, for example, connected, to an address bus, not shown. Microprocessor 130 is then coupled to the address bus.

Preferably, at a step 210 (HIT?), device 100 determines whether one of buffers 102 and 104 already contains the data of the corresponding address in the memory. If such is not the case (output N of block 210), the method proceeds to a step 220.

At step 220, the filling mode is selected between a simultaneous filling mode (for example, when signal SEL is at high level '1') and a sequential filling mode (for example, when signal SEL is at low level '0'). If the simultaneous filling mode is selected, the method proceeds to a step 230. If the sequential filling mode is selected, the method proceeds to a step 240. The order of steps 210 and 220 may be exchanged.

At step 230 (READ_A&B), the contents of locations 112 and 114 are read from memory no, preferably simultaneously. Preferably, these locations are consecutive and contain the data located at the request address. Preferably, when the reading is over, an end-of reading signal is transmitted. The end-of-reading signal is preferably signal READ_END controlling the simultaneous filling of the buffers. The method then proceeds to a step 250 (FILL_BUFA&B) of simultaneous filling of buffers 102 and 104.

Preferably, at step 240 (ADDR(3)), device 100 selects, between, on the one hand, the set of locations 112 and, on the other hand, the set of locations 114, the set which contains the data located at the request address. In the example of memory locations 112 and 114 each containing 64 bits, the device for example determines the fourth bit, starting from the least significant bits (bit ADDR(3), the bits being generally numbered from 0). If bit ADDR(3) is equal to 0, the data contained at the request address is located in one of locations 112. If bit ADDR(3) is equal to 1, the data contained at the request address is located in one of locations 114. This example may be adapted for any number of bits of each location 112, 114, for example, 32 or 128 bits.

If the data contained at the request address is located in one of locations 112, the content of this location 112 is preferably read out at a step 262 (READ_A). Preferably, when the reading is over, an end-of-reading signal is transmitted. The signal is preferably signal READ_ENDA controlling the filling of buffer 102 only. The method proceeds to a step 272 (FILL_BUFA) of filling of buffer 102 with the content of the considered location 112. The content of buffer 104 is left unchanged at this stage.

If the data contained at the request address are located in one of locations 114, the content of this location 114 is preferably read out at a step 264 (READ_B). Preferably, when the reading is over, an end-of-reading signal is transmitted. The signal is preferably signal READ_ENDB controlling the filling of buffer 104 only. The method proceeds to a step 274 (FILL_BUFA) of filling of buffer 104 with the content of the considered location 114. Meanwhile, the content of buffer 102 is not modified.

Preferably, after steps 250, 272, and 274, the method proceeds to a step 280 (SELECT_DATA). At this step, device 100 determines the position, in buffers 102 and 104, of the data corresponding to the request address. Preferably, four positions are possible: the least significant bits of buffer 102; the most significant bits of buffer 102; the least significant bits of buffer 104; and the most significant bits of buffer 104.

Preferably, at a next step 290 (SEND_DATA), the data contained in buffers 102 and 104 at the position determined at step 280 are sent over data bus 120. The sent data may then be used by microprocessor 130 and/or cache memory 132. After step 290, the method preferably resumes at step 200 to receive a new request address.

If, at step 210, the data located at the new request address are already in one of buffers 102 and 104 (output Y of block 210), the method directly proceeds to step 280.

Preferably, signal SEL is modified at a step, not shown, of the method. The loop method thus implemented comprises simultaneous fillings of the buffers, and fillings of only one of the two buffers and then of only the other one of the two buffers. The method enables to successively send over bus 120 the data located at various request addresses received at steps 200.

In a preferred embodiment, locations 112 are located in a first memory bank, and locations 114 are located in a second memory bank. When the selected filling mode is the sequential filling, for each request address, at most one content is read out from a single one of the two banks. This enables to decrease the power consumption as compared with the reading of the content of the two banks for each request address. When the selected filling mode is the simultaneous filling, the two filled buffers enable, as compared with sequential fillings, to save time, for example, when processing unit 130 and/or cache memory 132 need data located at consecutive addresses. The tradeoff between the execution speed and the power consumption can thus be optimized.

Figure 3:
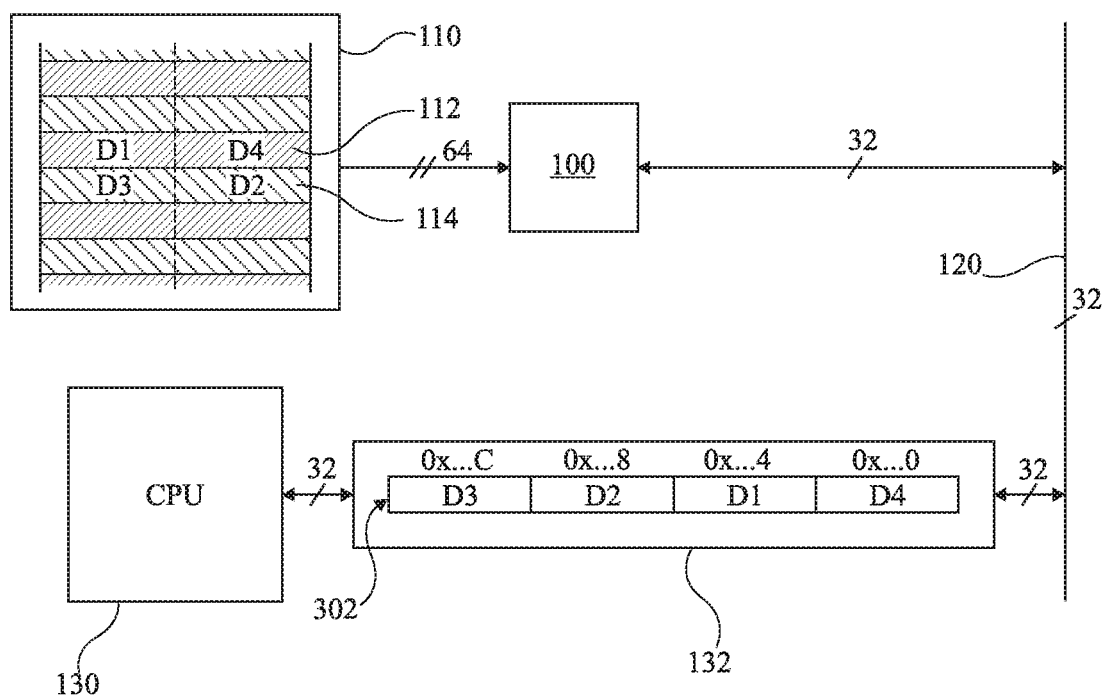
FIG. 3 schematically shows an example of implementation of the method of FIG. 2 by a chip of the type in FIG. 1.

FIG. 3 schematically shows an example of implementation of the method of FIG. 2 by a chip of the type of that in FIG. 1, when the buffers are sequentially filled.

In this example, the data are 32-bit words, data bus 120 is a 32-bit bus, locations 112 and 114 of memory no each contain 64 bits, and cache memory 132 contains locations 302, each containing 128 bits. Thus, each location 302 of the cache memory may contain four pieces of data. Each location is for example intended to receive the data located in memory 110 at respective logic addresses 0x . . . 0, 0x . . . 4, 0x . . . 8, et 0x . . . C.

It is assumed that the microprocessor needs the data located at logic address 0x . . . 4, which data are not present in cache memory 132. One of the locations 302 of the cache memory is then entirely filled. For this purpose, successive requests are sent to device 100 so that it successively sends the four corresponding pieces of data over bus 120. The first request concerns address 0x . . . 4. This enables the corresponding data D1 to be available as soon as possible for the microprocessor. The next requests successively have addresses 0x . . . 8, 0x . . . C, and 0x . . . 0.

Figure 4:
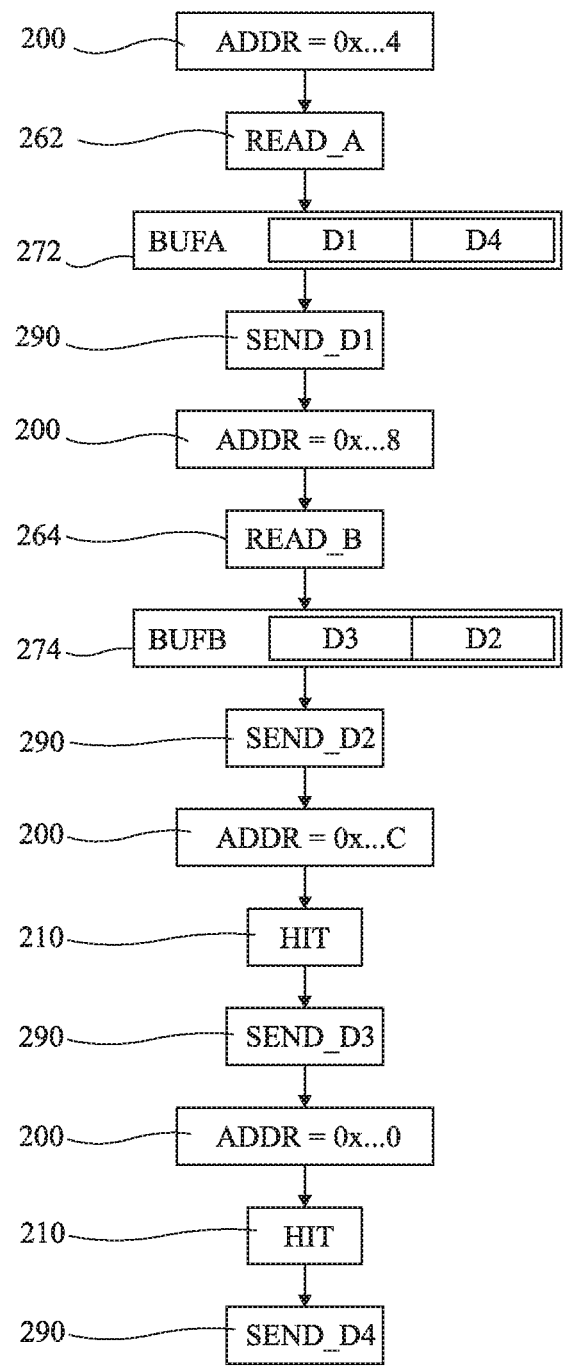
FIG. 4 schematically shows steps of the method of FIG. 2 in the example of FIG. 3.

FIG. 4 schematically shows steps of the method of FIG. 2 in the example of FIG. 3.

Request address 0x . . . 4 is received at step 200 (ADDR=0x . . . 4). Data D1 located at request address 0x . . . 4 are contained in one of locations 112. This location 112 further contains the data D4 located at address 0x . . . 0. The method transits through step 262 of reading out the content of location 112 (READ_A), and then through step 272 of filling of buffer 102 with this content. As a result, buffer 102 then contains the two pieces of data D1 and D4. Data D1 are sent at the next step 290 (SEND_D1).

Then, request address 0x . . . 8 is received at step 200 (ADDR=0x . . . 8). Data D2 located at request address 0x . . . 8 are contained in one of locations 114. This location 114 further contains the data D3 located at address 0x . . . C. The method transits through step 264 of reading out the content of this location 114 (READ_B), and then through step 274 of filling of buffer 104 with this content. As a result, buffer 104 then contains the two pieces of data D2 and D3. Data D2 is sent at the next step 290 (SEND_D2).

Then, request address 0x . . . C is received at step 200 (ADDR=0x . . . C). After step 210 (HIT), due to the fact that the corresponding data D3 are contained in buffer 104, the method directly proceeds to step 290 of sending data D3 (SEND_D3).

Finally, request address 0x . . . 0 is received at step 200 (ADDR=0x . . . 0). After step 210 (HIT), due to the fact that the corresponding data D4 are contained in buffer 102, the method directly proceeds to step 290 of sending data D4 (SEND_D4).

Thus, the four pieces of data D1, D2, D3, and D4 are sent in this order by only carrying out a step of reading out the content of locations 112 and a step of reading out the content of locations 114. If there was only one buffer fillable with a content of locations 112 and 114, three readout steps would have been necessary. The method thus enables to send memory contents faster than with a single buffer. Further, the tradeoff between execution speed and power consumption can be improved, as compared with a device having an operating mode where two buffers are simultaneously filled and an operating mode where only one of the two buffers can be filled.

The method is particularly fast for other successions of request addresses than that disclosed in the example of FIGS. 3 and 4. This advantage particularly exists in the case where cache memory 132 is omitted and microprocessor 130 alternately needs data contained in a same location 112 and a same location 114. In this case, once buffers 102 and 104 have been filled, the data are sent over bus 120 with no memory content readout step.

Figure 5:
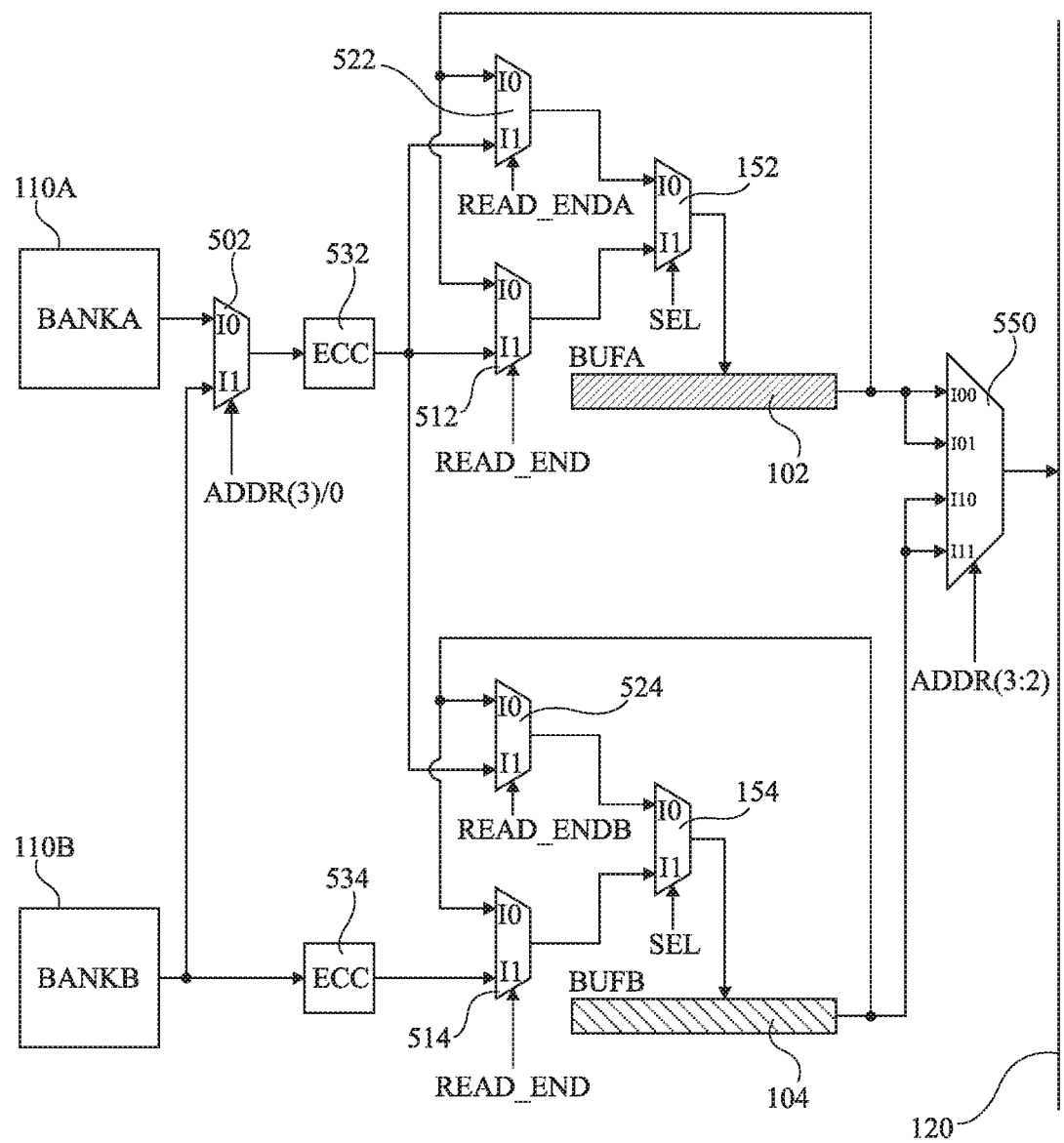
FIG. 5 partially and schematically shows a chip comprising an embodiment of a method of reception of contents of memory locations.

FIG. 5 partially and schematically shows a chip comprising an embodiment of a device of reception of the content of memory locations.

Memory 110 preferably comprises a memory bank 110A (BANKA), having locations 112 located therein, and a memory bank 110B (BANKB), having locations 114 located therein.

Preferably, bank 110A supplies the content of a memory location to an input I0 of a multiplexer 502. The content is supplied after having been selected by its address and read out from the memory. As an example, bank 110B similarly supplies the content of a memory location to an input I1 of multiplexer 502. Multiplexer 502 is for example controlled by a signal ADDR(3)/0. Signal ADDR(3)/0 for example has a low level when the simultaneous filling mode is selected.

Preferably, when the sequential filling mode is selected, the level of signal ADDR(3)/0 enables to select the bank which contains the data located at request address ADDR. Signal ADDR(3)/0 then preferably corresponds to bit ADDR(3). The output of multiplexer 502 is coupled to inputs I1 of multiplexers 512, 522, and 524. As an example, an error correction circuit 532 (ECC) is located between the output of multiplexer 502 and the inputs of multiplexers 512, 522 and 524. Multiplexers 512 and 522 each receive on an input I0 the content of buffer 102. Multiplexer 512 is controlled by signal READ_END. Multiplexer 522 is controlled by a signal READ_ENDA. Multiplexer 152 (FIG. 1) then receives the outputs of multiplexers 512 and 522.

Preferably, the content supplied by bank 110B is received by an input I1 of a multiplexer 514. As an example, an error correction circuit 534 (ECC) is located between the output of bank 110B and input I1 of multiplexer 514. Multiplexers 514 and 524 each receive on an input I0 the content of buffer 104. Multiplexer 514 is controlled by signal READ_END. Multiplexer 524 is controlled by a signal READ_ENDB. Multiplexer 154 (FIG. 1) then receives the outputs of multiplexers 514 and 524.

As an example, the least significant bits of buffer 102 are coupled to an input I00 of a multiplexer 550; the most significant bits of buffer 102 are coupled to an input I01 of multiplexer 550; the least significant bits of buffer 104 are coupled to an input I10 of multiplexer 550; and the most significant bits of buffer 104 are coupled to an input I11 of multiplexer 550. Multiplexer 550 is for example controlled by set ADDR(3:2) of the third and fourth bits, starting from the least significant bits, of the request address. Preferably, inputs I00, I01, I10, and I11 are selected according to the respective state '00', '01', '10', and '11' of bits ADDR(3:2). The output of multiplexer 550 is coupled to bus 120.

Preferably, the links between banks 110A and 110B, multiplexers 152, 154, 502, 512, 514, 522, and 524, and buffers 102 and 104 may transmit in parallel all the bits of a memory location content.

Preferably, the links between buffers 102 and 104, multiplexer 550, and bus 120 may transmit in parallel all the bits of a piece of data, preferably 32 bits.

Figure 6:
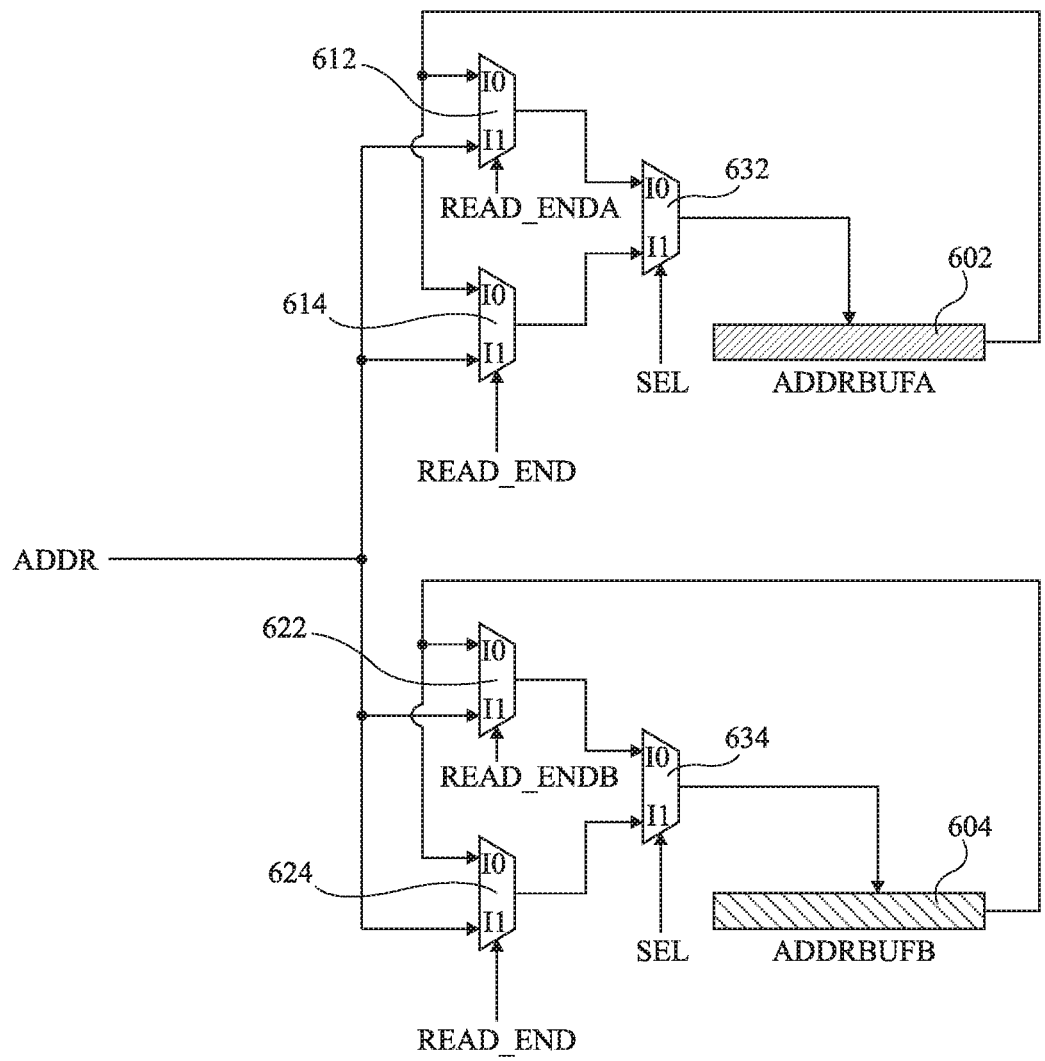
FIG. 6 schematically shows a portion of the device of FIG. 5.
Figure 7:
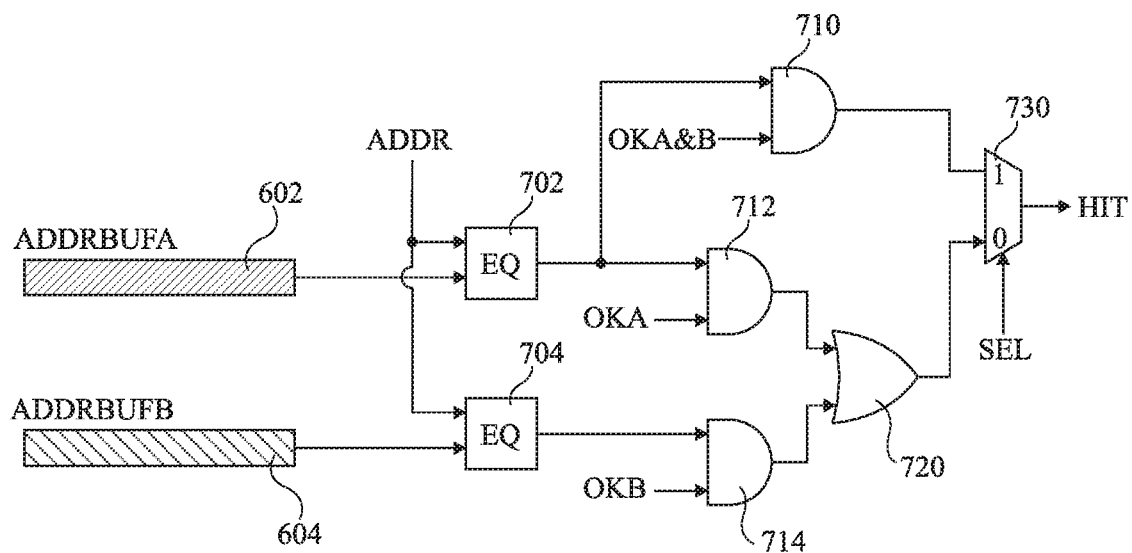
FIG. 7 schematically shows another portion of the device of FIG. 5.

FIGS. 6 and 7 schematically show portions of the reception device of FIG. 5, enabling to implement step 210 (HIT?) of the method of FIG. 2.

The device comprises two buffers 602 (ADDRBUFA) and 604 (ADDRBUFB) for storing the request address. The request address is received by inputs I1 of multiplexers 612, 614, 622, and 624. Multiplexers 612 and 614 receive the content of buffer 602 on inputs I0. The outputs of multiplexers 612 and 614 are coupled to the inputs of a multiplexer 632 controlled by signal SEL. Multiplexers 622 and 624 receive the content of buffer 604 on inputs I0. The outputs of multiplexers 622 and 624 are coupled to the inputs of a multiplexer 634 controlled by signal SEL. Multiplexers 612 and 622 are respectively controlled by READ_ENDA and READ_ENDB. Multiplexers 614 and 624 are controlled together by signal READ_END.

In operation, when the simultaneous buffer filling mode is selected, the two buffers 602 and 604 are filled with the request address associated with the filling of buffers 102 and 104 (step 250 of the method of FIG. 2). When the sequential filling mode is selected, buffer 602 or 604 is filled with the request address associated with the filling of the respective buffer 102 or 104 (step 262 or 264). On filling of one of the two buffers 602 and 604, the content of the other one of the two buffers 602 and 604 is left unchanged.

The content of buffers 602 and 604 thus corresponds to the request address associated with the filling of buffers 602 and 604.

In FIG. 7, buffer 602 is coupled to an input of a circuit 702 (EQ) receiving the request address on another input. Circuit 702 is a circuit for verifying the equality between the values received on its two inputs. Preferably, circuit 702 supplies a high level when the received values are equal, and a low level when the received values are different. The output of circuit 702 is coupled to an input of an AND gate 710. AND gate 710 receives a signal OKA&B at another input. The output of circuit 702 is further coupled to an AND gate 712. AND gate 712 receives a signal OKA at another input.

Buffer 604 is coupled to an input of a circuit 704 (EQ) for verifying the equality between two inputs. Circuit 704 receives the request address on the other one of its two inputs. The output of circuit 704 is coupled to an input of an AND gate 714. AND gate 714 receives a signal OKB at another input.

The outputs of AND gates 712 and 714 are coupled to the input of an OR gate 720. The outputs of OR gate 720 and of AND gate 710 are coupled to a multiplexer 730. Multiplexer 730 is controlled by signal SEL. Multiplexer 730 supplies a signal HIT.

Each of signals OKA, OKB, and OKA&B is activated, for example, set to a high level, when validity conditions are fulfilled, concerning: buffers 102 and 602 for signal OKA; buffers 104 and 604 for signal OKB; and the four buffers for signal OKA&B. Such conditions are for example the lack of an ongoing filling of the concerned buffers, of an ongoing reading out from the memory, the presence of valid data in the buffers, etc.

In operation, signal HIT is activated when the data located in the memory at the request address are already present in the content of buffers 102 and 104. Signal HIT is then used at step 210 (HIT?) of the method of FIG. 2.

Any circuit enabling to carry out step 210 of the method of FIG. 2 may be used instead of the circuits of FIGS. 6 and 7. Preferably, such a circuit is configured to store into buffers the addresses of the contents filling the buffers. The circuit then determines whether the stored address corresponds to that of a new request. As a variation, step 210 may be omitted.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereinabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device comprising:
   a first buffer coupled to a memory through a first bus that is fillable with contents of a first memory location;
   a second buffer coupled to the memory through the first bus and a second bus that is fillable with contents of a second memory location, wherein the first memory location and the second memory location have alternating addresses in the memory; and a selection circuit coupled to the first buffer and coupled to the second buffer, the selection circuit configured to select a filling mode between simultaneous filling of the buffers and sequential filling of the buffers, wherein, during the simultaneous filling, the first buffer is filled using the first bus and simultaneously the second buffer is filled using the second bus, and wherein, during the sequential filling, the second buffer is filled using the second bus after filling the first buffer using the first bus.

2. The device of claim 1, wherein the contents of the first memory location and the second memory location comprise a plurality of bits of data, each of the buffers being configured to be simultaneously filled with the plurality of bits of data.

3. The device of claim 2, comprising a driver configured to send N bits of data over a bus having N parallel lines, N being a real number greater than one.

4. The device of claim 3, wherein the driver comprises a multiplexer.

5. The device of claim 1, further comprising two additional buffers sequentially fillable with addresses of respective contents of the first and second memory locations.

6. The device of claim 1, wherein the device is configured so that the sequential filling of the buffers comprises filling the first buffer with the contents of the first memory location and then filling the second buffer with the contents of the second memory location, the first memory location and the second memory location being consecutive memory locations of the memory.

7. A device comprising:
a first buffer;
a second buffer;
a first bus having a bus width, the first bus coupled to the first buffer and the second buffer; and
a second bus having the bus width, the second bus coupled to the second buffer but not the first buffer;
wherein the device is configurable between a first transfer configuration and a second transfer configuration;
wherein, in the first transfer configuration, first data is transferred to or from the first buffer using the first bus and second data is transferred to or from the second buffer using the second bus simultaneously; and
wherein, in the second transfer configuration, the first data is first transferred to or from the first buffer using the first bus and then the second data is transferred to or from the second buffer using the first bus.

8. The device of claim 7, further comprising a processor coupled to the first bus and the second bus.

9. The device of claim 8, further comprising a non-volatile memory, wherein the first buffer and the second buffer are located between the processor and the non-volatile memory.

10. The device of claim 7, further comprising a non-volatile memory coupled to the first buffer and the second buffer.

11. The device of claim 10, wherein the first buffer is configured to store the first data from a first memory location of the non-volatile memory and the second buffer is configured to store the second data from a second memory location of the non-volatile memory, the device further comprising a third buffer configured to store the address of the first memory location and a fourth buffer configured to store the address of the second memory location.

12. A method of operating a memory coupled to a bus configurable between a large bus size configuration and a small bus size configuration, the method comprising:
configuring the bus to the large bus size configuration;
performing a first transfer operation by simultaneously transferring data from the memory to a first buffer and transferring data from the memory to a second buffer across the bus configured with the large bus size;
after performing the first transfer operation, configuring the bus to the small bus size configuration; and
performing a second transfer operation by first transferring data from the memory to the first buffer across the bus configured with the small bus size and then transferring data from the memory to the second buffer across the bus configured with the small bus size.

13. The method of claim 12, wherein the large bus size is twice as large as the small bus size.

14. The method of claim 12, wherein performing the first transfer operation and performing the second transfer operation each comprise filling the first buffer with data from a first memory location of the memory and filling the second buffer with data from a second memory location of the memory, the first and second memory locations having alternated addresses.

15. The method of claim 12, wherein performing the first transfer operation and performing the second transfer operation each comprise transferring data from a location of the memory, the method further comprising storing an address of a first memory location of the first buffer into a third buffer and storing an address of a second memory location of the second buffer into a fourth buffer.

16. The method of claim 15, further comprising verifying that a request matches the address of the first memory location stored in the third buffer and the address of the second memory location in the fourth buffer.

17. The method of claim 12, further comprising:
receiving a read request from a processor, the read request including an address of a non-volatile memory coupled to the first and second buffers;
comparing an address of the data stored in the first and second buffers with the address included in the read request;
when the address of the data stored in the first and second buffers matches the address included in the read request, transferring data from the first and second buffers using either the first transfer operation or the second transfer operation; and
when the address of the data stored in the first and second buffers does not match the address included in the read request, first transferring data from the non-volatile memory to the first and second buffers and then transferring data from the first and second buffers using either the first transfer operation or the second transfer operation.

18. The method of claim 12, wherein performing the first transfer operation comprises filling the first buffer with contents of a first memory location and the second buffer with contents of a second memory location, the first and second memory locations being consecutive memory locations.

19. The method of claim 12, wherein performing the second transfer operation comprises filling the first buffer with the contents of a first memory location and the second buffer with the contents of a second memory location, the first memory location and the second memory location being consecutive memory locations.

* * * * *